(12) United States Patent
Walker

(10) Patent No.: US 6,445,737 B1
(45) Date of Patent: Sep. 3, 2002

(54) DIGITAL MODULATION DEVICE IN A SYSTEM AND METHOD OF USING THE SAME

(76) Inventor: Harold Walker, 78 Oliver St., Edison, NJ (US) 08820

(*) Notice: Subject to any disclaimer, the term of this patent is extended or adjusted under 35 U.S.C. 154(b) by 0 days.

(21) Appl. No.: 10/062,030

(22) Filed: Jan. 31, 2002

Related U.S. Application Data

(60) Provisional application No. 60/267,951, filed on Feb. 9, 2001.

(51) Int. Cl.[7] ............................................... H03K 7/04
(52) U.S. Cl. ....................................... 375/239; 332/112
(58) Field of Search ................................ 375/130, 239; 332/112

(56) References Cited

U.S. PATENT DOCUMENTS

| | | | | |
|---|---|---|---|---|
| 3,667,046 A | * | 5/1972 | Schoolcraft | 327/176 |
| 4,641,317 A | * | 2/1987 | Fullerton | 375/130 |
| 5,666,379 A | * | 9/1997 | Ovard et al. | 370/213 |

* cited by examiner

Primary Examiner—Don N. Vo
(74) Attorney, Agent, or Firm—Daniel L. Dawes; Myers, Dawes & Andras LLP

(57) ABSTRACT

A wireless digital transmission and receiving method combines phase reversal keying with pulse position modulation. Modulation of a transmitted signal implements pulses that are of extremely short duration to indicate ones and zeros. These pulses can be as narrow as one cycle of the carrier frequency. As such, they often appear as missing cycles or pulses in a sequence of carrier cycles. The method synthesizes a sideband with no carrier or other sidebands from the carrier of an input signal. This synthesized sideband is represented by a broad sinx/x spectrum with a principal power peak at the modulated frequency and numerous weaker peaks of varying frequencies and peak levels. The time duration of these smaller peaks is such that they have negligible mean power levels. Thus, the synthesized signal can withstand the degradation caused by multipath interference and fading. The weaker peaks also do not cause measurable interference with other communications devices. The smaller peaks can have amplitudes far below the noise level of the system. Hence, the smaller peaks are not a necessary or an important component of the signal. The result is a strong signal in the form of a synthesized single sideband with all the useful modulation in the brief phase reversal period with a constant signal in the remainder of the bit period that can be used to establish a reference to create uniform time rise and amplitude.

25 Claims, 6 Drawing Sheets

24.000 MHZ   5.000 MHZ   10 kHz   1 kHz   1.0s

20

DIGITAL MODULATION DEVICE IN A SYSTEM AND METHOD OF USING THE SAME

This application is a continuation of provisional application Ser. No. 60/267,951, filed Feb. 9, 2001.

BACKGROUND OF THE INVENTION

1. Field of the Invention

The field of endeavor of the present invention is an apparatus and method for the transmission of digital data utilizing a carrier having the characteristics of a sideband with a very narrow bandwidth so as to reduce the bandwidth of the principal energy bearing portion of the transmitted radio frequency spectrum.

2. Description of the Prior Art

Single sideband transmission of information without a carrier is well known. For the transmission of digital data utilizing a single sideband, some form of baseband data encoding is generally required to reduce the bandwidth. The encoded data is then applied to a single sideband modulating device, which suppresses the carrier and removes one of the sidebands by a filtering or phasing method.

U.S. Pat. Nos. 4,742,532, 5,185,765 and 5,930,303, issued to the present inventor are representative of the prior art. A 'PCT' application published as WO 99/23754 (U.S. Ser. No. 98/23140) is an international filing of the '303 patent. U.S. patent application Ser. No. 09/612,520 is directed to a method related to the '303 patent.

The method described in the first and second of the above patents results in some frequency spread in the transmitted spectrum. The latter patent describes a method known as VMSK that results in a single frequency spectral line with phase changes so slight that they are not visible on spectrum analyzers. The VMSK method results in a very high spectral efficiency that enables very high data rates to be transmitted in a very narrow bandwidth. It was also found that it is not necessary to restore the suppressed carrier to detect the signal.

Since the modulation and filtering produce a spectrum of a single frequency, special very narrow band filters are required to pass the narrowest bandwidth possible to remove undesirable spectral components in the transmitter and to reduce the noise bandwidth in the receiver. In the '303 patent, phase reversals of the carrier are utilized together with a balanced modulator to remove the carrier. The phase reversal periods are made as nearly even as possible in order to reduce undesirable spectral components. When only one sideband is transmitted, after passing through the narrow bandwidth filter, the observed signal on the oscilloscope does not show the phase reversals at nearly equal time periods. Instead, the signal shows a complete phase rotation through 360 degrees at the transition periods of the phase reversing signals. The duration of this phase rotation is three to four cycles of the sideband frequency, which normally has 60 to 90 cycles per bit period. For the remainder of the bit period, the sideband frequency is constant in frequency and phase.

All of the useful modulation is contained in the brief phase rotation period. For the remainder of the bit period there is a constant signal that can be used to establish a reference. In the prior art, the data clock and the RF frequency are not necessarily numerically related so that there is a phase crawl or difference among the various crossings periods. This results in an inconsistent detected output, which varies in rise time and amplitude.

There is a need for a modulation method that will synthesize the sideband of the prior art by itself, with brief phase reversals at timed intervals representing digital ones or zeros. There is a need for a modulation method of this kind, and that does not require the use of a carrier similar to what has been done; yet without the customary single sideband processing with its drawbacks. That is, phase crawl or difference among the various crossings periods needs to be reduced or eliminated. This would fill an end goal or need for a method that results in a consistent detected pattern in rise time and amplitude.

Several complementary objects of the present invention involve elements in a system that comprises the invention. Hence, one object of the invention is to provide a detection means that will detect the simulated sideband of the invention without the restoration of a carrier separated in frequency from the sideband by ½ the data rate. Another object of the invention is to provide a signal processing means that will result in no apparent loss of signal power. Still another object of the invention is to provide a signal that can withstand the degradation caused by multipath interference and fading.

The present invention fills these needs as can be seen in the further description below.

BRIEF SUMMARY OF THE INVENTION

The wireless digital transmission and receiving method of the present invention combines phase reversal keying with pulse position modulation. The invention implements pulses that are of extremely short duration to indicate ones and zeros. These pulses can be as narrow as one cycle of the carrier frequency. As such, they often appear as missing cycles or pulses in a sequence of carrier cycles. The method creates a broad sinx/x spectrum with a principal power peak at the modulated frequency and numerous weaker peaks of varying frequencies and peak levels. The time duration of these smaller peaks is such that they have negligible mean power levels. The weaker peaks also do not cause measurable interference with other communications devices. Also, the smaller peaks can have amplitudes far below the noise level of the system. Hence, the smaller peaks are not an important component of the signal.

It is well known to those skilled in the art that all modulation energy is concentrated in the sidebands. It can be shown that the spectrum of the present invention represents a sideband only and not a carrier with two sidebands. It can also be shown that this sideband is comprised of a single frequency that does not change in frequency or phase for most of the bit period. The modulation occurs as a phase reversal of one cycle, or as the absence of one cycle in a series of cycles. The resulting "missing pulses" or "missing cycles" are detected to indicate digital ones and zeros in a signal of fixed frequency. It is possible to detect these "missing pulses" or "missing cycles" at preset time periods.

The method is extremely resistant to multipath interference, since the weaker path is a signal at the same single frequency as the stronger path, but of different phase. The phasors of the two paths add to produce large detected outputs for the principal path and weak outputs at a different time for the reflected path. Thus, this weak response can be time gated out of the resulting signal.

In a practical first embodiment of the invention, a circuit is used to create very narrow pulses utilizing pulse position modulation to distinguish ones and zeros. The narrow pulses are used in a phase reversing device, such as an XOR gate or balanced mixer, to cause the reversal of one cycle out of a stream of many cycles. The resulting spectrum has a principal peak at the modulated frequency and many minor peaks spread at bit rate intervals. The minor peaks have power levels proportional to the time duration of the pulses of each phase. The mean power of the minor peaks is low. Therefore, it is not normally required to provide bandpass filtering at the transmitter.

In a second embodiment, an AND gate is used to remove one cycle from the modulated frequency so that "missing cycle" modulation results. The result is the same as that for phase reversal.

In all embodiments, the timing of the narrow pulse and the start of the cycles of the modulated frequency can be made to coincide with each other so that the detected output has a uniform rise time and amplitude.

The present invention may be used in conjunction with any number of elements in a system. For example, in a system, the receiving apparatus is made to correspond with the method and device of the present invention. The receiving apparatus is comprised of a special very narrow bandwidth filter, having almost zero group delay, in combination with a limiter, synchronous detector, and pulse position decoder. The synchronous detector is locked in frequency and phase to the pulse modulated frequency.

In such a system, the pulse position decoder recovers the data clock and includes gating circuitry to turn the circuit off except at the expected time of a phase change arrival.

In particular, the invention is defined as a method of transmitting and receiving digital data in a wireless communications system. In transmitting the method comprises the steps of phase reversal keying a carrier frequency of a signal used for transmitting and/or receiving digital data, and pulse position modulating the signal by generating two pulses having opposite phases, namely generating a primary pulse of the two pulses taking a majority fraction of a bit period, and generating a secondary pulse of the two pulses having a minority fraction of a bit period. The time position of the secondary pulse carrying modulation information.

The step of generating the secondary pulse generates a pulse having a duration equal to or less than 3 to 4 cycles of the carrier frequency. In a preferred embodiment the step of generating the secondary pulse generates a pulse having a duration equal to one cycle of the carrier frequency.

The step of phase reversal keying a carrier frequency of a signal comprises reversing the phase of the signal beginning at a data clock boundary, and continuing for 1 to 3 cycles to represent a digital one. Again in the preferred embodiment the step of phase reversal keying a carrier frequency of a signal comprises reversing the phase of the signal beginning after a short delay following a data clock boundary to represent a digital zero.

In another embodiment the step of phase reversal keying a carrier frequency of a signal comprises reversing the phase of the signal beginning at a data clock boundary to represent a digital zero and reversing the phase of the signal after a short delay after a data clock boundary to represent a digital one.

In a preferred embodiment the step of phase reversal keying a carrier frequency of a signal comprises providing a maximum acceptable duration between the phase reversals by maintaining the phase of the carrier in a undisturbed state for substantially the duration of the number of carrier frequency cycles left in the bit period after the brief reversal. For example the step of pulse position modulating the signal comprises maintaining the frequency and phase of the first primary pulse for at least 95% of the bit period to provide the maximum acceptable undisturbed duration.

The step of pulse position modulating the signal results in a spectrum containing a multiplicity of sinx/x frequency peaks. The spectrum has a single maximal frequency peak at the carrier frequency and numerous minor low level frequency peaks of differing amplitudes separated from the maximal frequency peak at intervals equal to the bit rate. In the preferred embodiment the step of pulse position modulating the signal comprises creating the maximal frequency peak to contain approximately 99% of the total radiated power of the spectrum. Alternatively, the step of pulse position modulating the signal comprises creating the lower level frequency peaks spread such that the individual mean power of the lower level frequency peaks is less than one millionth of the maximal frequency peak at the carrier frequency.

The step of phase reversal keying a carrier frequency of a signal comprises representing a single RF cycle phase reversal as a missing pulse while retaining pulses for all other RF cycles of the bit period.

The step of pulse position modulating the signal comprises creating a spectrum with a main energy peak characteristics of a single sideband related to a phantom carrier in which the main energy peak is synthesized into a single side band, such that the signal no longer has other sidebands relative to the main energy peak. The step of pulse position modulating the signal comprises creating the minor frequency peaks with a short duration much less than one bit period, so that the minor frequency peaks thus do not pass through a conventional filter, and so that the maximal frequency peak passes the conventional filter as a single frequency without indication of modulation.

In receiving the method further comprises the step of demodulating the signal in which a maximal frequency peak is modulated by received signals from a principal transmission path and at least one echo path during a time interval which is much less than a bit period, so that the principal transmission path and the echo path are detected as having separable phase reversal transition times, thereby reducing multipath interference.

In receiving the method further comprises the step of demodulating the signal in which the minor frequencies peaks are either lower in amplitude than the system noise or are removed by filtering.

The invention is also defined as a communications system for transmitting digital data comprising: encoding means for phase reversal keying a carrier frequency of a signal used for transmitting and/or receiving digital data; and modulating means for pulse position modulating the signal by generating two pulses having opposite phases, namely for generating a primary pulse of the two pulses occupying a majority fraction of a bit period, and for generating a secondary pulse of the two pulses occupying a minority fraction of a bit period, the position of the secondary pulse carrying the modulation information.

The system includes a system clock and the encoding means comprises a narrow pulse width generator responsive to a data input by creating a pulse having no delay relative to a clock to represent a digital one, and the pulse width generator responsive to a data input by creating a pulse having a short delay after the relative to the clock to represent a digital zero.

In one embodiment only pulses representing a digital one are transmitted or encoded by the encoding means.

The modulating means comprises a balanced modulator, wherein the balanced modulator causes phase reversals, but does not suppress a carrier. The modulating means may be an XOR gate or other commonly used balanced modulator.

The system also receives the signal and further comprises filtering means. The filtering means comprises a monopole crystal with a high Q. The monopole crystal is caused to continuously resonate at the carrier frequency, such that the filtering means cannot reverse a resonant phase in the short time period of the narrow pulse width, so that the filtering means passes a modulated signal without following the phase change of the secondary pulse, and so that the filtering means rejects signals which have a frequency which differs from the carrier frequency.

In receiving the system further comprises a detecting means. The detecting means comprises a synchronous detector locked to the single transmitted frequency. The detecting means generates a spiked output only during a time of the pulse generated by the narrow pulse width generator. The detecting means typically comprises an XOR gate. The XOR gate responds to phase reversals or to missing pulses in the signal.

As a receiver the system further comprises a decoding means, a receiver data clock, and an output circuit. The decoding means produces a spiked output at the time of a digital one. The spiked output resets the receiver data clock and sets the output device to indicating that a digital one has been received.

The invention now having been briefly summarized, its various features and embodiments may be visualized in the following drawings and illustrations, where like elements are referenced by like numbers.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
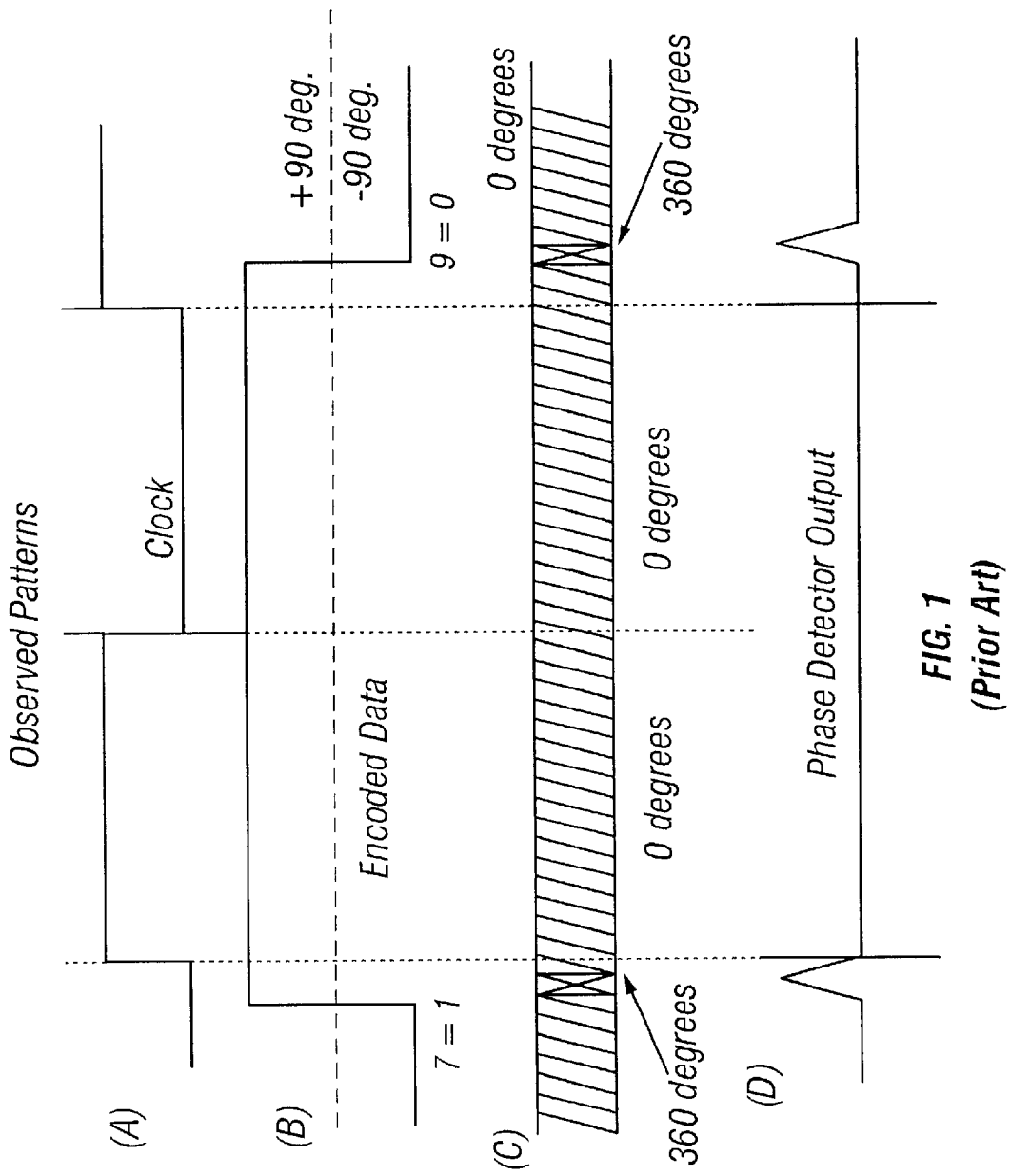
FIG. 1 is a graph depicting phase reversal and the pulses caused by phase reversal in the prior art.

FIG. 1, shows the effect of phase reversal keying on pulses of nearly the same time duration using the prior art. When only one sideband is present, the phase does not shift from +90-degrees to −90-degrees as might be expected, but undergoes a phase rotation of 360 degrees. This is the equivalent of going from 0-degrees through 180-degrees and back to 0-degrees. This phase rotation occurs at the transition time and lasts only a few cycles of the carrier frequency.

FIG. 1, line (B) shows the phase reversal time. Line (C) shows the observed phase rotational change. Line (D) shows the output of a synchronous detector, which can detect either amplitude or phase. The output has a narrow spike during the phase rotation. This spike may have a variation in its rise time and peak amplitude because the zero crossing time of the data clock in line (A) and the start of the RF cycle in the transmitted signal are not coordinated.

It is the object of the present invention to artificially create this phase change in a more efficient manner and thereby reduce or eliminate as much undesirable radiation as possible. The undesirable radiation is caused by phase crawl or difference among the various crossings periods. This results in an inconsistent detected output, which varies in rise time and amplitude. As set forth above, this is because the data clock and the RF frequency are not numerically made to correspond to each other.

To solve this problem, the present invention utilizes a method for generating pulse position modulation including phase reversal keying. The generation of pulse position modulation involving phase reversal keying according to the present invention includes the creation of two pulses having opposite phases. The primary pulse is very broad, occupying 97% or more of the bit period. The pulse of the opposite phase is very narrow, ordinarily occupying 3% or less of the bit period. The narrow pulse carries the modulation information. The broad pulse corresponding to a much longer time period can be considered an 'Off' time during which a reference signal is being transmitted.

Figure 2:
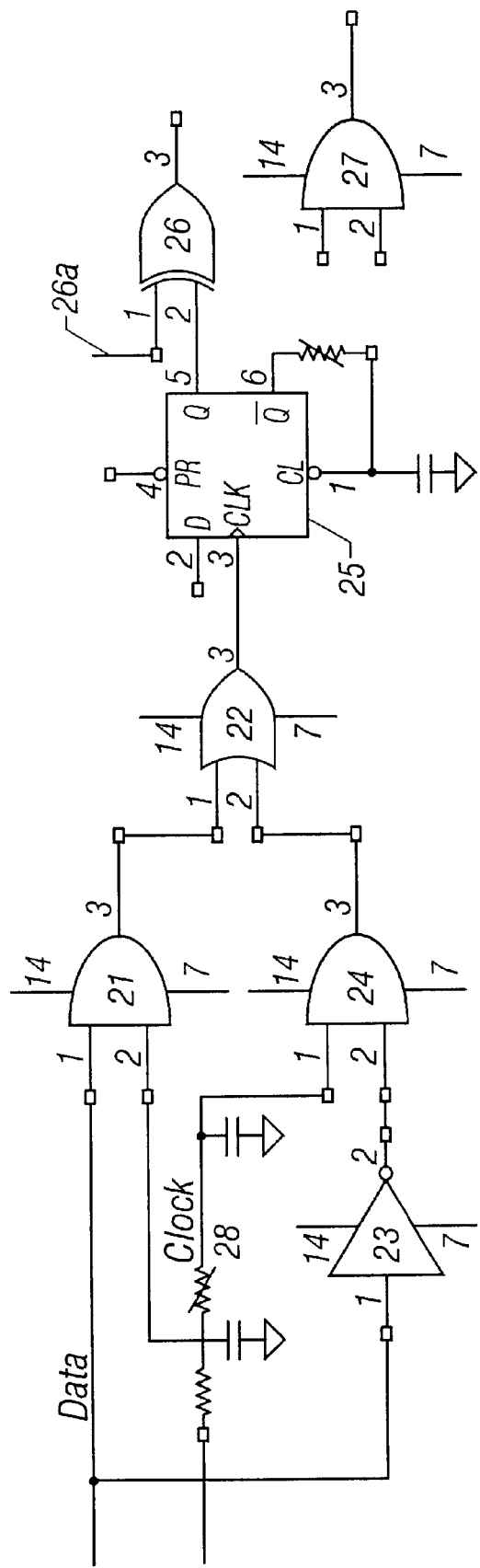
FIG. 2 is a schematic of a pulse position modulator with phase reversal of the present invention.

A device to achieve this is shown in FIG. 2. In this device, digital data consisting of the ones and zeros is applied to two AND gates (21) and (24). The data applied to gate (24) is inverted by the inverter (23). A data clock is applied to the gates with a very slight delay to gate (21) and a longer delay to gate (24). The delay time is adjustable by the resistor (28). When a digital one is present, gate (21) passes the clock to the OR gate (22). When a digital zero is present, gate (24) is activated. The output of the only slightly delayed ones or the longer delayed zero clock is used to drive a one shot circuit (25) to produce a very narrow pulse, having a duration of one cycle. In this way, pulse position modulation is created.

As for the phase reversal, the narrow pulses drive a phase reversing device, such as the XOR gate (26), which causes the phase reversal of the carrier. It can be shown that the resulting output does not have the characteristics of a carrier, but advantageously that of a sideband. Alternately, an AND gate (27) can be used to cause a missing cycle instead of a reversed cycle.

In a system, one element may be a decoding means. Such a decoding means may incorporate a decoding circuit. A decoding circuit does not use the longer delayed pulses passing vbia gate (24), so the longer delayed pulses are not necessary. Ones only that pass via gate (21) need be transmitted. Therefore, the present invention implemented with only a decoding means permits the use of a ones-only embodiment. In the ones only embodiment, the RC delay circuit (28) and gates (22), (23) and (24) can be omitted from the device of FIG. 2.

Figure 3:
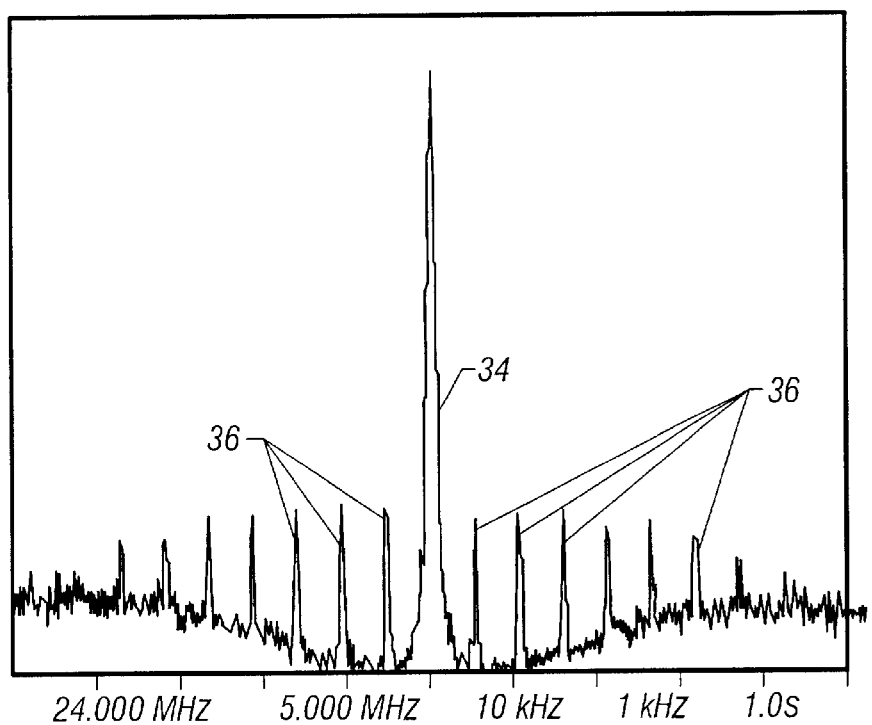
FIG. 3 is a graph of a spectrum with pulse position modulation and phase reversal of the pulse 'Off' time in accordance with the present invention

FIG. 3 shows the spectrum resulting from the pulse position modulation with phase reversal of the present invention. The main peak (34) has the characteristics of the side band and is shown at the center. As such, the main peak (34) contains all of the necessary modulation energy. The minor peaks 36 typically have measured mean power levels between −70 and −80 dB below the major peak. The peak power of the minor peaks 36 is higher, but the FCC regulations only requires mean power measurements. Expressing the difference of the power levels of the minor peaks to the main peak in another way is that the mean power of the minor pulses spread over a wide frequency range, taken individually, is less than one millionth of the mean power of the main pulse at carrier frequency.

It can be seen from FIG. 3 that the spectrum consists primarily of a single frequency, which has the characteristics of a sideband instead of a carrier. The minor peaks (36), as shown in FIG. 3, have peak powers of at least −50 dB below the main peak (34). Therefore, the minor peaks (36) can be submerged or buried below Gaussian noise without ill effect.

The function and performance of the XOR gate 26 in the device of the present invention is of particular interest. Normally, the XOR gate 26 functions as, (and is well known as), a balanced mixer. When driven by a rectangular waveform on its input 26a it produces an upper and a lower sideband starting at frequencies ½ the bit rate away from the carrier, while suppressing the carrier. However, these sidebands do not appear in the spectrum shown in FIG. 3. That is, they are absent in the spectrum produced by the device of FIG. 2. The carrier is not suppressed, but is the basis for the central peak although it now has the spectral position and characteristics of a sideband.

A filter may be used in a system implementing the device and method of the present invention in one or more of the system elements. As such, it is important to consider the effect that such a filter may have on the narrow pulses of the present invention. It is well known to those skilled in the art that a conventional filter, such as the 'Ideal Filter' or the "Nyquist Filter' has a group delay which is determined by the filter bandwidth and the phase change across that bandwidth. The narrower the filter bandwidth, the greater the group delay. Also, the greater the phase change across the filter, the greater the group delay. In order to pass a very narrow pulse through these conventional filters, the filter bandwidth must be approximately equal to 1/t, where 't' is the pulse width.

Figure 4A:
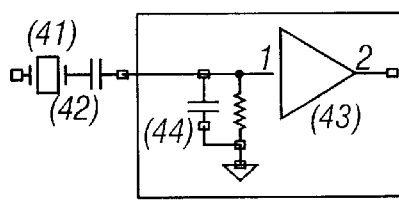
FIG. 4 is a schematic of a narrow bandwidth filter having very low group delay for pulse modulation.
Figure 4B:
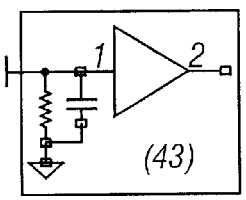
Figure 4C:
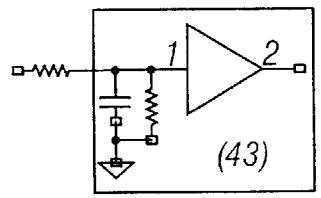

However, the pulses of the present invention are much narrower than permitted by conventional filters. Therefore, it is an object of the present invention to pass a very narrow pulse of the present invention through a filter. This can be accomplished by using a monopole crystal filter as shown in FIG. 4. The signal to be passed comprises a single frequency with very brief phase reversals, or even missing cycles. The monopole crystal (41) is caused to resonate at this single frequency. Under normal circumstances, the monopole crystal filter has a very large group delay and cannot change phase abruptly. However, when faced with a sudden very brief phase reversal, it behaves as if it were a pure resistance and passes the phase reversal, or missing cycle, unaltered. On the other hand, for noise outside the resonant peak, the normal group delay applies and the crystal acts as a normal crystal filter.

FIG. 4 shows the monopole crystal filter circuit with accompanying circuit items as used in a practical embodiment. The crystal (42) is caused to resonate with a large group delay at the transmitted single frequency. This large group delay also implies that large build up and decay periods are necessary. The build up period is for the crystal to reach peak resonance, and the decay period is for the crystal to stop resonating at a certain frequency. Due to the large decay period required, the crystal (42) cannot follow an abrupt frequency phase change. Instead, abrupt changes are passed as if the crystal were an open wire, or an infinite impedance at its parallel resonant frequency. The unique feature of this circuit is that it appears to have two group delay responses. The response at the peak frequency is very short, while the response to frequencies off resonance is very long.

FIG. 4 further shows a tuning capacitor (43). Tuning capacitor (43) enables the crystal resonance frequency to be trimmed to the exact signal frequency. The amplifier (46) presents a resistive load (45). This load is shunted by an internal circuit capacitor (44) so that the load is a complex impedance, which should be kept as close to purely resistive as possible to reduce the RC effects.

In practice in a system, no filter is needed at the transmitter, since the minor peaks have very low mean power levels. A filter is needed at the receiver to reduce the noise bandwidth and reject adjacent channels. Since the method is a phase reversal rather than an amplitude modulation method, limiting can be used following the bandpass filter.

Figure 5:
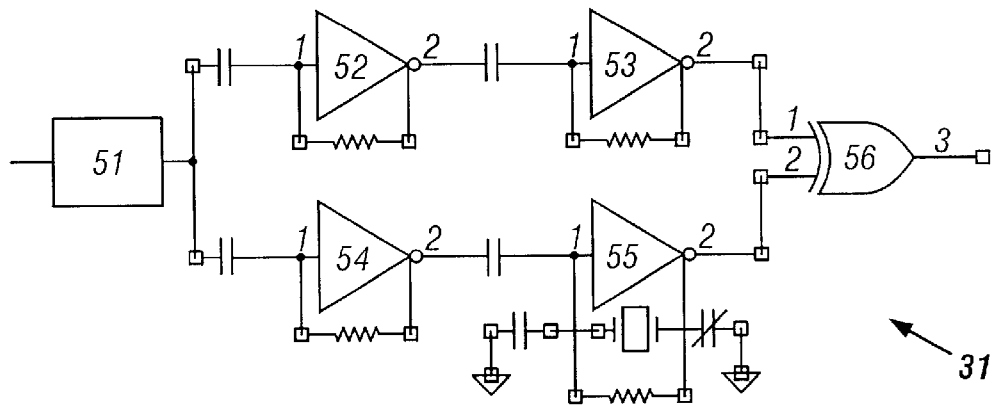
FIG. 5 is a schematic view of a detector for pulse position modulation.

In a system utilizing the method of the present invention a detector, generally denoted by reference numeral 31, as shown in FIG. 5, may be used. Detecting may be implemented after the filtering and limiting set forth above. To this end, a 'synchronous' or 'autodyne' type detector may be used to detect phase reversals or missing pulses (cycles). FIG. 5 shows a typical synchronous phase detector. The single frequency signal from the limiter is passed though a bandwidth filtering circuit comprising circuit 51 to amplifiers (52), (53) and (54). These amplifiers are integrated circuits having zero hysteresis, such as the types 74AC04 or 74HC04. In this circuit they each have a feed back resistor. Thus, the amplifiers (52), (53) and (54) function as analog amplifiers.

In the lower path of the circuit (31) shown in FIG. 5, a crystal controlled oscillator (55) is locked to the incoming signal to provide a phase reference without phase changes. The output of this phase reference is passed to a phase detector (56), where it is compared with the incoming signal having phase changes to yield an output during the phase change. The phase change period can be varied by the pulse delay time provided by element 28 of the circuit in FIG. 2. Optimum operation uses only one cycle at the modulated frequency, since this results in the minor peaks having the lowest possible power level.

The XOR gate 56 as it is applied as a phase detector in the detector circuit of FIG. 5, has no output when the two inputs are of the same phase, but has a maximum output when they are opposite in phase. Thus, the response is the same as if one of the cycles were missing.

Figure 6:
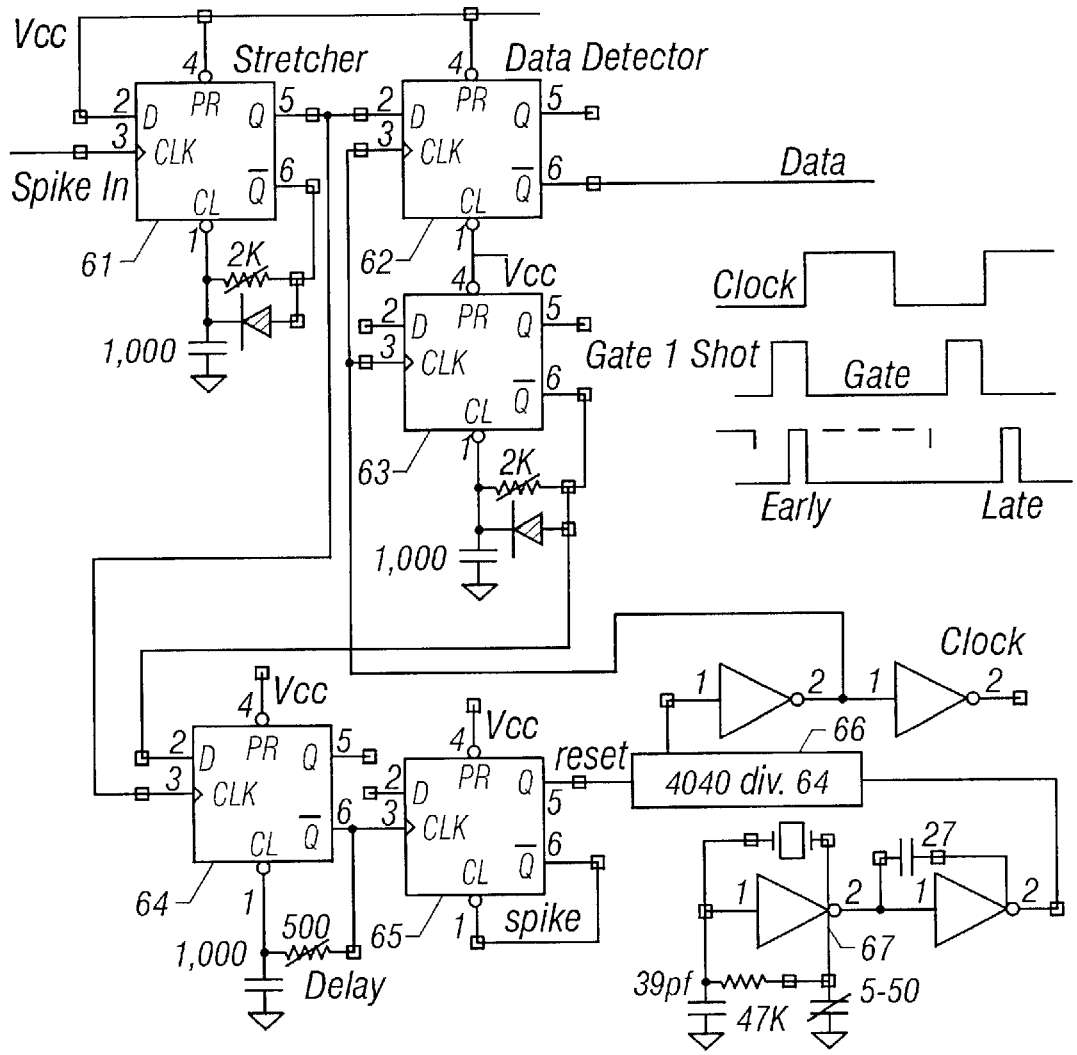
FIG. 6 is a schematic view of a decoder for pulse position modulation.

FIG. 6 shows a decoding means comprising a decoding circuit for use in a system implementing the present invention. As such, the circuit of FIG. 6 is a decoder for decoding a pulse position modulated signal. This circuit utilizes the only-slightly-delayed pulses to indicate the presence of a digital one. The digital-one (early) pulses reset the data clock and close a gate circuit. In order to block out unwanted signals, a gating circuit (63) opens just prior to the expected arrival time of the ones pulse. Once the pulse is received, the gate is closed until the next opening period.

The very narrow pulses from the phase change detector (31) are expanded in width by the pulse stretcher (61). The stretched pulses are passed to the data detector (62) and to the clock resetting pulse generators (64) and (65). The D input of the data detector (62) is held high until the clock reads the data and passes it to the output of (62) as a high or one output. A delayed pulse sets the D input low after the clock rise. Therefore, the data detector (62) clocks out a low or digital zero.

The leading edge of the stretched pulse causes a delay pulse to be generated by the pulse generator (64). The back side (inverted) pulse delays the pulse driving the spike generator (65). The spike generator (65) creates a very narrow spike, which resets the divider (66) to cause the data clock to rise at the reset time. A crystal controlled oscillator (67) operating at a multiple of the data clock, (usually 32 or 64 times the clock rate), has its output divided down by the frequency divider (66). A gating circuit (63) is used to open the circuits to the incoming pulses for a brief period of time just ahead of the expected arrival time of the desired signal representing a digital one. The gate closes when the clock has been reset. This prevents an unwanted resetting of the data clock by noise or multipath echoes.

Figure 7:
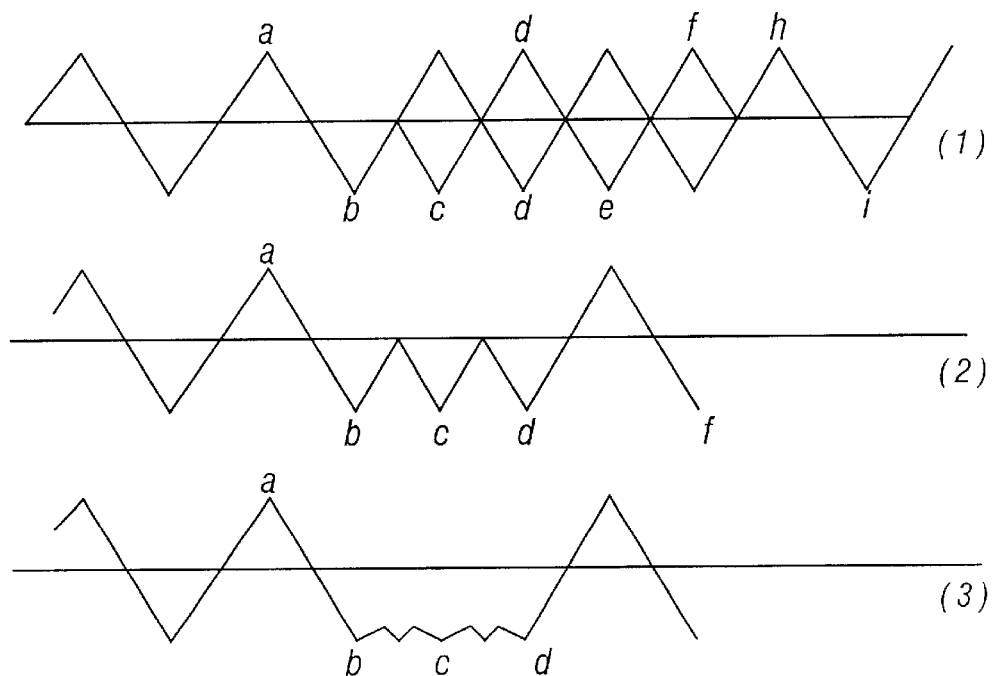
FIG. 7 is a graph depicting the effects of a filter on phase reversals.

FIG. 7 shows the effects of filtering on the phase reversal. The normal RF cycles, which are present for more than 95% of the time, are shown as having a peak at (a). A phase reversal occurs at (b) with a negative peak 180 degrees out of phase at (c) and (e). On the third cycle, the phase is reversed and the peaks occur at (h) and (i) with the normal phase as shown on line (1) of FIG. 7.

When only one cycle is involved, the pattern shown in FIG. 7, line (2) occurs. The frequency for that brief period of time is doubled. The filter cannot pass a frequency at twice or half the normal and rejects it, resulting in the appearance of a missing cycle as shown in FIG. 7, line (3). This missing cycle will be seen any time the frequency is doubled or halved. Considering each cycle as a pulse, the missing cycle can be considered a missing pulse. Missing pulses can alternatively be created directly by the use of an AND gate in lieu of the XOR gate as indicated in FIG. 2.

Figure 8:
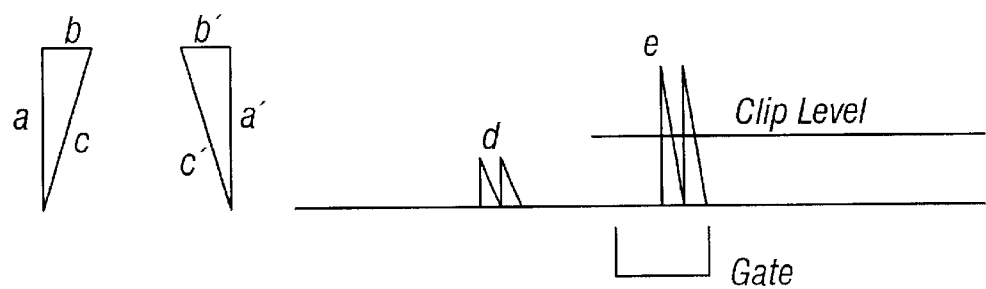
FIG. 8 is a diagram showing multipath effects of a signal on RF transmission in accordance with the present invention.

FIG. 8 shows the measured effect of a multipath signal on the present pulse position modulated signal at the detector (31) output. The desired main path has a strong phasor (a). The reflected or echo path has a weaker phasor (b). The phasor sum (c) remains fixed for most of the bit period. When a phase reversal of the weaker echo path occurs, the phasor sum is momentarily changed to (c'), then reverts to the position at (c).

The detected outputs are shown for the weak path at (d) and for the strong path at (e). The stronger signal can be clipped at a level just above (d) to remove the weaker signal (d). The gate 63 in FIG. 6 can be set to accept only the stronger pulses (e) and reject noise between pulses.

It has been shown that second path signals approaching −3 dB can be tolerated without the use of error correction for an acceptable digital voice quality with the present invention. This is an improvement of about 12 dB better than the tolerance level for other methods.

The improvement in multipath reception is a result of a very narrow pulse time period for the desired and the reflected path. This period is much less than the full bit period. If the two paths do not overlap there is almost no interference. Other modulation methods occupy the full bit period, hence the interference from the second path is much greater.

Figure 9:
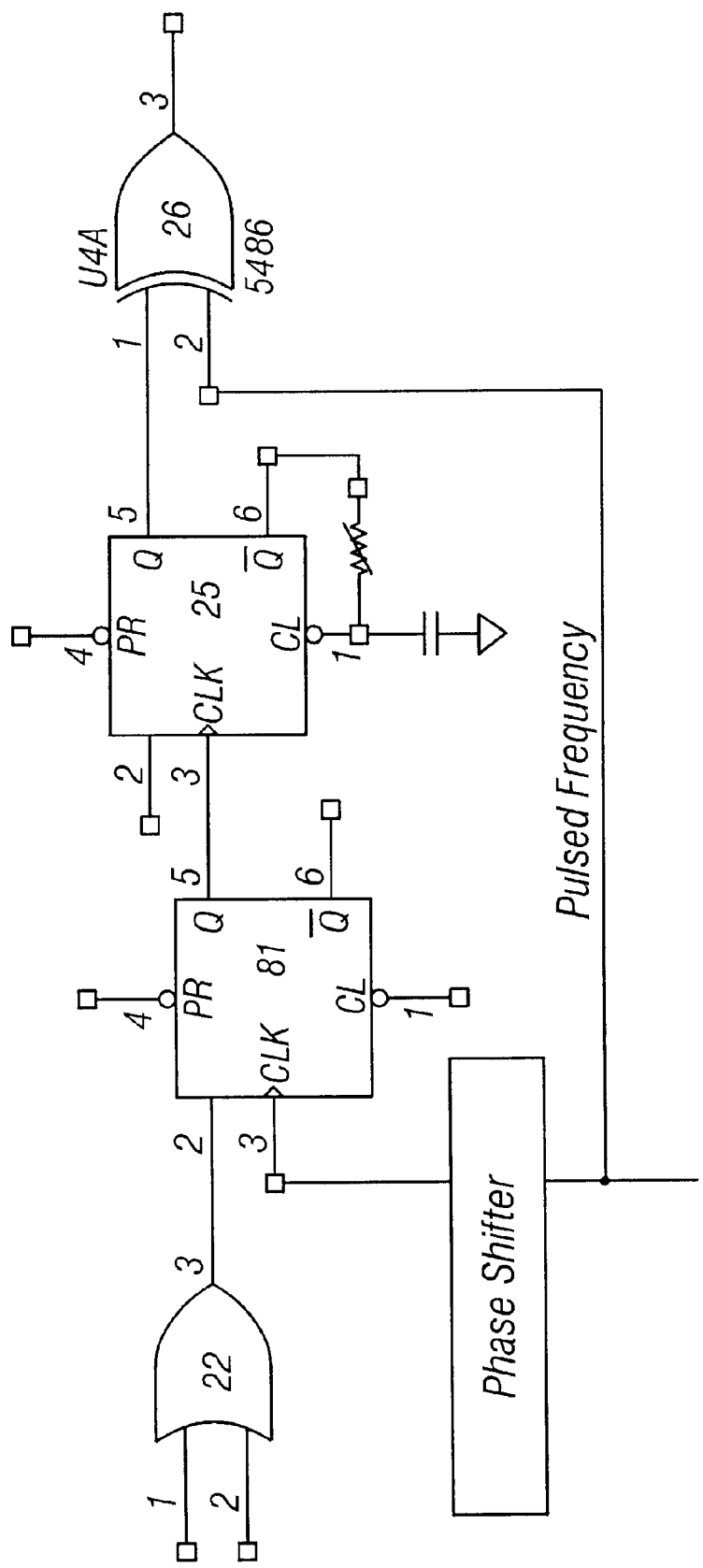
FIG. 9 is a schematic view of a synchronizer for pulse and RF cycles.

FIG. 9 shows a simple means for optimizing (synchronizing) the relationship between the pulse and the RF frequency. The output of the OR gate (22) in FIG. 2 is applied to the D input of the coordinating D flip flop (81). The RF frequency is applied through a phase shifter to cause the output of D flip flop (81) to occur at the most effective time to cause a phase reversal in the XOR gate (26). This keeps the power level of the detected signal substantially uniform. Even though there is a slight variation in timing, this variation is of substantially no consequence to the decoder.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A method of transmitting digital data in a wireless communications system, the method comprising:
    phase reversal keying a carrier frequency of a signal used for transmitting and/or receiving digital data, and
    pulse position modulating the signal by generating two pulses having opposite phases, namely generating a primary pulse of the two pulses taking a majority fraction of a bit period, and generating a secondary pulse of the two pulses having a minority fraction of a bit period, the secondary pulse being position modulated to carry the modulation information.

2. The method of claim 1 wherein generating the secondary pulse generates a secondary pulse having a duration equal to or less than 3 to 4 cycles of the carrier frequency.

3. The method of claim 2 wherein generating the secondary pulse generates a secondary pulse having a duration equal to one cycle of the carrier frequency.

4. The method of claim 1 where phase reversal keying a carrier frequency of a signal comprises reversing the phase of the signal beginning at a data clock boundary, and continuing for 1 to 3 cycles to represent a digital one.

5. The method of claim 1 where phase reversal keying a carrier frequency of a signal comprises reversing the phase of the signal beginning after a short delay following a data clock boundary to represent a digital zero.

6. The method of claim 1 where phase reversal keying a carrier frequency of a signal comprises reversing the phase of the signal beginning at a data clock boundary to represent a digital zero and reversing the phase of the signal after a short delay after a data clock boundary to represent a digital one.

7. The method of claim 1 where phase reversal keying a carrier frequency of a signal comprises providing a maximum acceptable duration between the phase reversals by maintaining the phase of the carrier in an undisturbed state for substantially the duration of the number of carrier frequency cycles left in the bit period after reversal.

8. The method of claim 7, where pulse position modulating the signal comprises maintaining the frequency and phase of the first primary pulse for at least 95% of the bit period to provide the maximum acceptable duration.

9. The method of claim 1 where pulse position modulating the signal comprises creating a spectrum containing a multiplicity of sinx/x frequency peaks, the spectrum having a single maximal frequency peak at the carrier frequency and numerous minor low level frequency peaks of differing amplitudes separated from the maximal frequency peak at intervals equal to the bit rate.

10. The method of claim 9 where pulse position modulating the signal comprises creating the maximal frequency peak to contain approximately 99% of the total radiated power of the spectrum.

11. The method of claim 9 where pulse position modulating the signal comprises creating the lower level widespread frequency peaks so that the mean power of the individual lower level frequency peaks is less than one millionth of the maximal frequency peak at the carrier frequency.

12. The method of claim 1 where phase reversal keying a carrier frequency of a signal comprises representing a single RF cycle phase reversal as a missing pulse while retaining pulses for all other RF cycles of the bit period.

13. The method of claim 1 wherein pulse position modulating the signal comprises creating a spectrum with a main energy peak characteristic of a single sideband related to a phantom carrier in which the main energy peak is synthesized into a single side band, such that the signal no longer has other significant sidebands relative to the main energy peak.

14. The method of claim 9 where pulse position modulating the signal comprises creating the minor frequency peaks with a short duration much less than one bit period, so that the minor frequency peaks thus do not pass through a conventional filter due to the long group delay, and so that the maximal frequency peak passes the conventional filter, which has normal group delay as a single frequency without indication of modulation.

15. The method of claim 9 further comprising demodulating the signal in which a maximal frequency peak is modulated by received signals from a principal transmission path and at least one echo path during a time interval which is much less than a bit period, so that the principal transmission path and the echo path are detected as having separable phase reversal transition times, thereby reducing multipath interference.

16. The method of claim 9 further comprising demodulating the signal in which the minor frequency peaks are either lower in amplitude than the system noise or are removed by filtering.

17. A communications system for transmitting digital data comprising:
    encoding means for phase reversal keying a carrier frequency of a signal used for transmitting and/or receiving digital data; and
    modulating means for pulse position modulating the signal by generating two pulses having opposite phases, namely for generating a primary pulse of the two pulses occupying a majority fraction of a bit period, and for generating a secondary pulse of the two pulses occupying a minority fraction of a bit period, the secondary pulse position carrying the modulation information.

18. The system of claim 17 in combination with a system clock wherein the encoding means comprises a narrow pulse width generator responsive to a data input by creating a pulse having no delay relative to a clock to represent a digital one, and the pulse width generator responsive to a data input by creating a pulse having a short delay after the relative to the clock to represent a digital zero.

19. The system of claim 18 in which only pulses encoded by the encoding means to represent a digital one are transmitted.

20. The system of claim 17 in which the modulating means comprises a balanced modulator, wherein the balanced modulator causes phase reversals, but does not suppress a carrier.

21. The system of claim 17 in which the modulating means comprises an XOR gate.

22. The system of claim 17 where the system also receives the signal and further comprises filtering means which in turn comprises a monopole crystal with a high Q, wherein the monopole crystal is caused to continuously resonate at the carrier frequency, such that the filtering means cannot reverse a resonant phase in the short time period of the narrow pulse width, so that the filtering means passes a modulated signal without following the phase change of the secondary pulse, and so that the filtering means rejects signals which have a frequency which differs from the carrier frequency.

23. The system of claim 18 where the system also receives the signal and further comprises detecting means which in turn comprises a synchronous detector locked to a single transmitted frequency, the detecting means for generating a spiked output only during a time of the pulse generated by the narrow pulse width generator.

24. The system of claim 23 in which the detecting means comprises an XOR gate, wherein the XOR gate responds to phase reversals or to missing pulses in the signal.

25. The system of claim 17 where the system also receives the signal and further comprises decoding means, a receiver data clock, and an output circuit, the decoding means for producing a spiked output at the time of a digital one, the spiked output resetting the receiver data clock and setting the output device to indicating that a digital one has been received.

* * * * *